No. 794,563. PATENTED JULY 11, 1905.
C. D. STAHLKNECHT.
DOG COLLAR AND LEASH.
APPLICATION FILED MAR. 29, 1905.
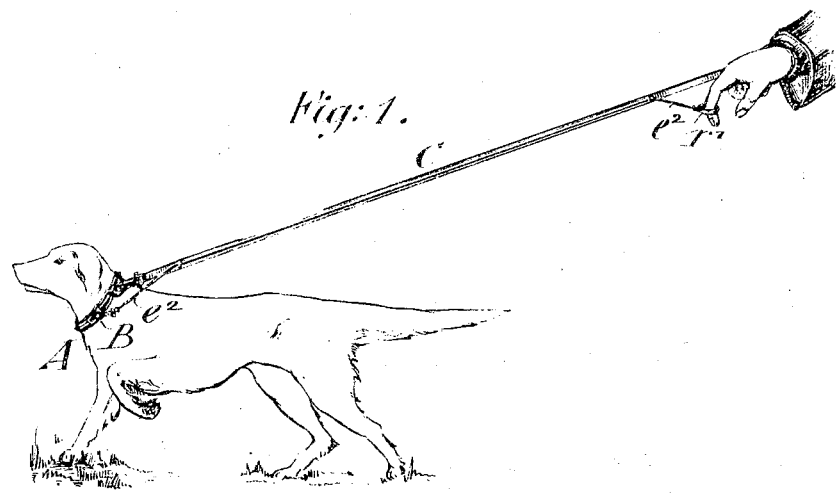
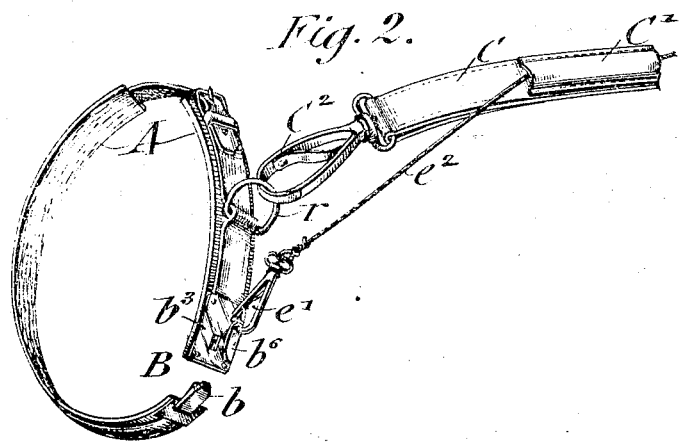
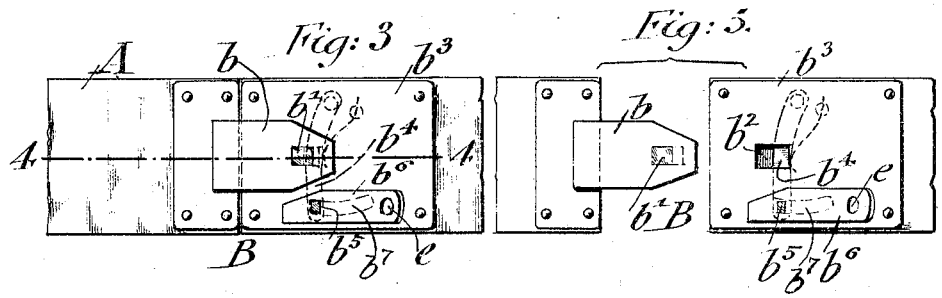
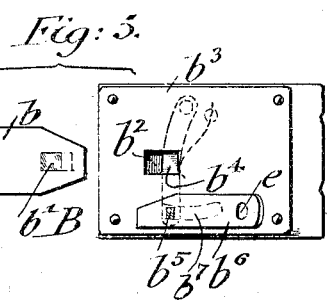
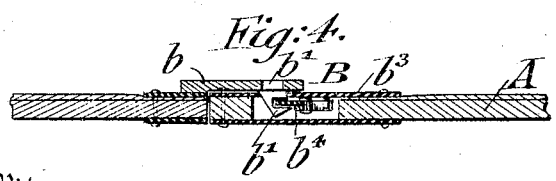

No. 794,563. Patented July 11, 1905.

UNITED STATES PATENT OFFICE.

CARL DETMAR STAHLKNECHT, OF BREMEN, GERMANY.

DOG COLLAR AND LEASH.

SPECIFICATION forming part of Letters Patent No. 794,563, dated July 11, 1905.

Application filed March 29, 1905. Serial No. 252,641.

*To all whom it may concern:*

Be it known that I, CARL DETMAR STAHLKNECHT, a citizen of the Empire of Germany, residing in Bremen, in the Empire of Germany, have invented certain new and useful Improvements in Dog Collars and Leashes, of which the following is a specification.

This invention relates to an improved dog collar and leash by which a dog may be firmly held but instantly released when desired by unlocking the collar from the handle end of the leash, the leash and releasing device being attached to the collar whenever required for use; and the invention consists in the novel features which will be fully described hereinafter and finally pointed out in the claims.

In the accompanying drawings, Figure 1 is a perspective view of my improved dog collar and leash shown as applied for use. Fig. 2 is a perspective view of the dog-collar and its connection with the leash drawn on a larger scale, and Figs. 3, 4, and 5 are details of the lock of the collar and its releasing mechanism.

Similar letters of reference indicate corresponding parts throughout the several views.

Referring to the drawings, A designates a dog-collar of any approved construction which is provided at one side thereof with a separable lock B and with mechanism for unlocking it so as to release the collar from the neck of the dog. The lock B consists of a plate $b$, which is attached to one end of the collar and provided with an inclined catch or hook $b'$ at it under side, that is adapted to engage a recess $b^2$ in a buckle-shaped casing $b^3$, attached to the other end of the collar. In the casing $b^3$ is arranged a pivoted and spring-pressed latch $b^4$, which extends transversely to the recess $b^2$ and engages the catch or hook $b'$ when the same is inserted into the recess $b^2$. The latch $b^4$ is connected at its free end by a pin $b^5$ with a slide-piece $b^6$, said pin being guided in an arcuate slot $b^7$ of the casing $b^3$. The end of the slide-piece $b^6$ is provided with an eye $e$, to which is applied by a swiveled snap-hook $e'$ a releasing cord or line $e^2$, that is guided in a guide-sleeve $C'$, attached to a strong leash C, of leather or other material. The leash C is connected by a swiveled snap-hook $C^2$ with a ring $r$ on the collar A, as shown clearly in Fig. 2. The opposite end of the leash C is made in the shape of a loop and forms a handle through which the hand is placed so that one of the fingers may engage the ring $r'$ at the opposite end of the releasing cord or line, as shown in Fig. 1.

When it is desired to release the dog for returning the bird or other game or for any other purpose, the releasing-cord $e^2$ is pulled back by the finger, which is readily accomplished, as the pull of the dog on the leash holds the cord taut, so that when the line is pulled back the latch $b^4$ releases the hook $b'$ and produces the instant unlocking of the lock and the release of the collar from the neck of the dog.

The leash and releasing-cord are readily attached by the snap-hooks to the collar whenever it is desired to keep the dog in proper control, the leash being carried in the pocket or hunting-bag until required for use. My improved dog collar and leash thus forms a convenient device for sportsmen and others who desire to control and release their dogs in the manner described.

Having thus described my invention, I claim as new and desire to secure by Letters Patent—

1. The combination of a dog-collar provided with a separable lock, a leash attached to said collar, and a releasing cord or line connected with said lock and guided along said leash.

2. The combination of a dog-collar provided with a lock, a leash detachably connected with said collar, and a releasing cord or line detachably connected with the lock and guided along said leash.

3. The combination of a dog-collar provided with a lock comprising a catch or hook and a latch coöperating therewith, a leash connected at one end to said collar and provided at the other end with a loop, and a releasing cord or line guided along the leash and connected to said latch, said cord being provided adjacent said loop with a ring.

4. The combination, with a dog-collar provided with a lock comprising a hook and latch, and a slide-piece on said latch, of a leash connected by a swiveled snap-hook with a ring on said collar, and a releasing cord or line guided in a sleeve along the leash and connected by a swiveled snap-hook with said slide-piece.

In testimony that I claim the foregoing as my invention I have signed my name in presence of two subscribing witnesses.

CARL DETMAR STAHLKNECHT.

Witnesses:
ARTHUR FELMER JEWETT,
OTTO KEUBER.